United States Patent [19]

Webb

[11] 4,058,027
[45] Nov. 15, 1977

[54] CONTROL COUPLINGS

[75] Inventor: Oswald Webb, Coventry, England

[73] Assignee: GKN Transmissions Limited, Birmingham, England

[21] Appl. No.: 704,023

[22] Filed: July 9, 1976

[51] Int. Cl.² .......................... F16H 1/44; F16D 35/00; F16D 43/25

[52] U.S. Cl. .................................... 74/711; 180/44 R; 192/35; 192/57; 192/58 B; 192/58 C; 192/82 T; 192/107 C

[58] Field of Search ................. 74/710.5, 711; 192/35, 192/57, 58 B, 58 C, 82 T, 107 C; 180/44 R, 49

[56] References Cited

U.S. PATENT DOCUMENTS

| 3,211,022 | 10/1965 | Anderson | 74/711 |
| 3,760,922 | 9/1973 | Rolt | 74/710.5 X |
| 3,869,940 | 3/1975 | Webb | 74/711 |
| 3,923,113 | 12/1975 | Pagdin | 192/82 T X |

Primary Examiner—Allan D. Herrmann
Attorney, Agent, or Firm—Arnold, White & Durkee

[57] ABSTRACT

A coupling for controlling or limiting the angular velocity or angular acceleration between first and second rotatable members. The coupling has an enclosure containing viscous liquid in which first and second sets of interleaved elements and third and fourth sets of interleaved elements are arranged for rotation about a common axis. The first and third sets of elements have driving connections with the first rotatable member and the second and fourth sets of elements have driving connections with the second rotatable member. Spacing means are provided to space apart the facing surfaces of adjacent elements of at least one of said first and second sets and also at least one of said third and fourth sets so that the facing surfaces of adjacent elements of each spaced set are spaced apart by distances greater than the thicknesses of the portions of the elements of the other set interleaved between said facing surfaces. The spacing means provided for one or both of the third and fourth sets are resilient. A differential piston is provided which is subject to the pressure in the enclosure and a first spring means urges the piston to a first position in which the facing surfaces of adjacent elements of the or each spaced set of the third and fourth sets are spaced apart by distances greater than the thicknesses of the portions of the elements of the other set interleaved between the facing surfaces. The coupling is arranged so that as the pressure of the liquid in the enclosure increases the piston moves against the first spring means to cause an abutment carried by the piston to compress the resilient spacing means and bring the elements of the third and fourth sets into mutual clutching engagement.

10 Claims, 7 Drawing Figures

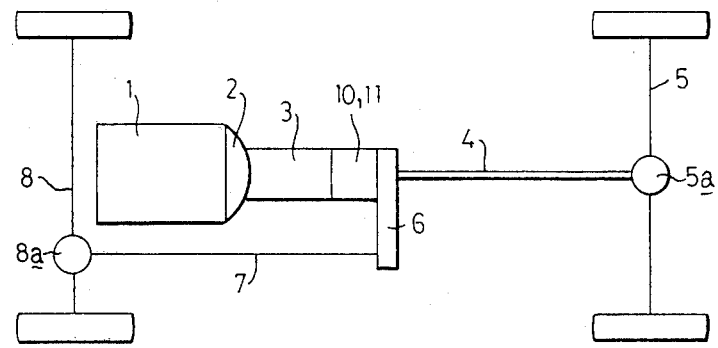
FIG.1.
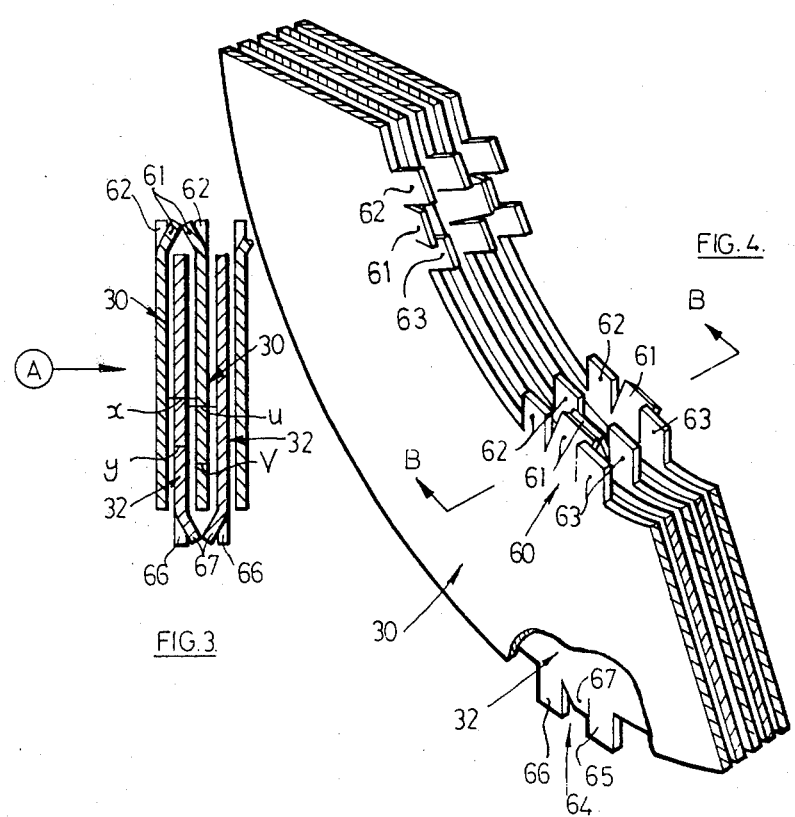
FIG.3.
FIG.4.

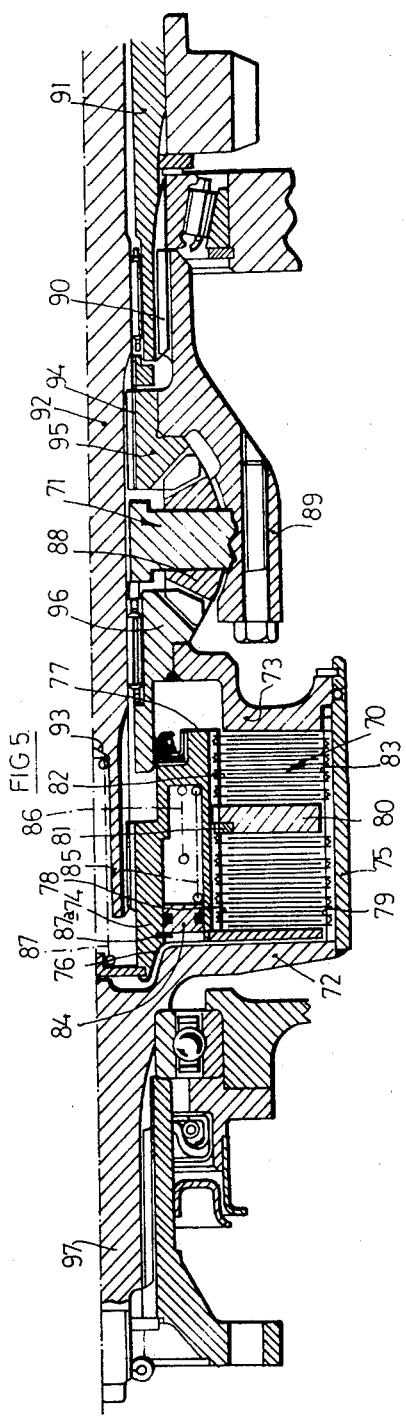
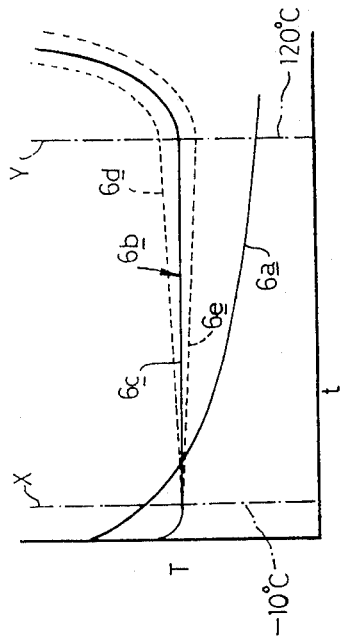
FIG. 6.
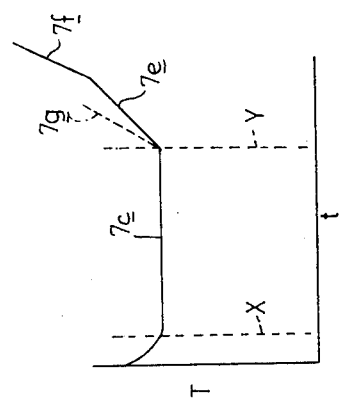
FIG. 7.

CONTROL COUPLINGS

BACKGROUND OF THE INVENTION

This invention relates to devices for controlling or limiting differences in angular velocity or angular acceleration between relatively rotatable members. Hereinafter such a device is referred to as "a control coupling". Control couplings may be used to control the relative rotation between parts of differential gearing and are particularly useful for controlling differential gearing which serves as an interaxle differential in a four-wheel-drive vehicle.

More particularly, the invention is concerned with a control coupling, hereinafter referred to as being of the kind specified, comprising mutually interleaved elements arranged for rotation about a common axis within an enclosure containing a viscous liquid in contact with adjacent working surfaces of said elements, alternate ones of said elements constituting a first set of elements for driving connection with a first rotatable member and remaining ones of said elements constituting a second set of elements for driving connection with a second rotatable member. In a control coupling of the kind specified, the liquid within the enclosure and the construction thereof will be such that, at a predetermined working temperature of at least 100° C, the pressure of the liquid in the enclosure rises substantially above ambient for the reasons explained below.

When a coupling of the kind specified is in use, with the elements of the first and second sets rotating relatively to one another energy will be dissipated in the coupling which will cause a rise in temperature thereof. The rise in temperature causes expansion of the liquid and the co-efficient of thermal expansion of the liquid is so much greater than that of the material of the enclosure that the pressure of liquid within the enclosure rises.

SUMMARY OF THE INVENTION

According to a first aspect of the invention we provide a control coupling of the kind specified including third and fourth sets of mutually interleaved elements in the form of clutch plates arranged for rotation in the enclosure about said axis, the elements of the third and fourth sets have driving connections with the first and second rotatable members respectively; spacing means to space apart adjacent elements of at least one of said first and second sets and resilient spacing means to space apart adjacent elements of at least one of said third and fourth sets so that the facing surfaces of adjacent elements of each spaced set are spaced apart by distances greater than the thicknesses of the portions of the elements of the other set interleaved between said facing surfaces; a differential piston (as hereinafter defined) subject to the pressure in the enclosure; and first spring means urging the piston to a first position in which the facing surface of adjacent elements of the or each spaced set of said third and fourth sets are spaced apart by distances greater than the thicknesses of the portions of the elements of the other set interleaved between said facing surfaces, the arrangement being such that as the pressure of the liquid in the enclosure increases the piston moves against the action of the first spring means to cause an abutment carried by the piston to deform said resilient spacing means and bring the elements of the third and fourth sets into mutual clutching engagement.

By "a differential piston" we mean a piston having different effective areas at its opposite ends so that when the piston is subjected to equal pressure on both ends the piston will move in a direction from the end having the larger effective area towards the end having the smaller effective area.

In a coupling embodying the invention heat is generated by the viscous shear of the liquid between the various elements as the first and second members rotate relative to each other. It is this generation of heat which raises the liquid pressure and hence displaces the piston as described above.

In a preferred construction the clutch provided by the third and fourth sets of elements is arranged to operate as a viscous shear coupling whenever the elements thereof are not in mutually clutching engagement. The spacing between the interleaved third and fourth sets of elements is progressively reduced as the liquid pressure increases.

When the coupling is arranged to operate as described in the preceding paragraph, as the elements of the third and fourth sets are brought closer together their torque transmitting capability increases. This compensates for the decrease in the torque transmitting capability of the coupling which occurs due to the decrease in the viscosity of the liquid as the temperature of the coupling increases. With the elements of the third and fourth sets in clutching engagement, which commences at a predetermined pressure, the freedom of the first and second members to rotate relative to each other becomes more limited and generation of heat in the coupling decreases thus allowing the coupling to cool and hence the liquid pressure to drop sufficiently to allow the first spring means to overcome the force of the piston and hence disengage the clutching elements of the third and fourth sets.

By spacing apart the facing surfaces of adjacent elements of one of said first and second sets, as described above, groups of three or more adjacent interleaved elements of said first and second sets are prevented from coming into engagement as might otherwise happen as movement of the piston occurs. This spacing ensures that the first and second sets of elements operate as a viscous shear coupling and retain an appreciable viscous shearing capacity and hence the temperature rise and pressure increase referred to above occur and the desired torque transmitting characteristic is obtained.

The torque transmitting characteristic of a coupling embodying the invention is particularly useful when used to control an inter-axle differential in a four-wheel-drive vehicle. Thus should there be some extraordinary heavy and prolonged duty or failure of the drive element from the differential to one of the axles, the resultant rise in temperature in the coupling will ultimately cause engagement of the clutch and the other axle will continue to drive. Moreover, should there be a failure of the front or rear brakes of the four-wheel-drive vehicle having an inter-axle differential controlled by a coupling embodying the invention, the nonbraked wheels will tend to be retarded more effectively due to the torque transmitted by the coupling.

If desired spacing means may be provided to space apart the facing surfaces of adjacent elements of both said first and second sets by distances greater than the thicknesses of the portions of the elements of the other set interleaved between said facing surfaces. This ensures that none of the working surfaces of the first and second sets can come into contact with each other and all these working surfaces are therefore free to cause viscous shear of the liquid.

Similarly resilient spacing means may be provided to space apart the facing surfaces of adjacent elements of both said third and fourth sets by distances greater than the thicknesses of the portions of the elements of the other set interleaved between said facing surfaces. This ensures that all the working surfaces of the third and fourth sets are free to cause viscous shear of the liquid whenever elements are not in mutual clutching engagement.

The spacing means for each spaced set may comprise axially extending projections on a peripheral portion of each element extending towards, and co-operating with, the projections on each adjacent element to give said spacing.

Preferably, the enclosure has inner and outer cylindrical walls coaxial with said axis which form said first and second rotatable members and the inner wall is provided by the differential piston.

In a preferred construction, the abutment is annular and, extends from the inner cylindrical wall towards the outer cylindrical wall thus dividing the enclosure into two parts, the elements of the first and second sets being on one side of the abutment in one part of the enclosure and the elements of the third and fourth sets being on the other side of the abutments in the other part of the enclosure.

The first spring means may be in the form of a Belleville washer which acts on the differential piston. The elements of the third and fourth sets may comprise annular metal discs having friction linings thereon.

An additional spring-loaded piston may be provided which is in communication with the enclosure so that increase in the liquid pressure in the enclosure upon or after the clutching engagement of the third and fourth sets moves the piston against a second spring means thereby increasing the volume of the enclosure and hence enabling the torque transmitting characteristic of the coupling after the engagement of the elements of the third and fourth sets to be controlled in dependence on the second spring means.

According to another aspect of the invention we provide the combination of a control coupling according to the first aspect of the invention and a differential gearing in which the elements of the first and third sets on the one hand and the elements of the second and fourth sets on the other hand are drivingly connected to two relatively rotatable elements of the gearing.

According to a further aspect of the invention, we provide a four-wheel-drive vehicle having front and rear driven axles and including the combination of the preceding paragraph, the differential gearing having two outputs which are connected to the front and rear driven axles respectively.

BRIEF DESCRIPTION OF DRAWINGS

Two embodiments of the present invention will now be described with reference to the accompanying drawings in which:

FIG. 1 is a diagrammatic representation of a four-wheel-drive vehicle which includes a coupling embodying the invention;

FIGS. 3 and 4 are detailed views of parts of the viscous shear elements used in the coupling of FIG. 2, FIG. 3 being a view on the line B-B of FIG. 4 and FIG. 4 being a perspective view in the direction of the arrow A of FIG. 3;

FIG. 5 is a half vertical section through a further form of coupling embodying the invention with part of an associated differential gearing, and FIGS. 6 and 7 show the torque transmitting characteristics of the couplings of FIGS. 2 and 5 respectively.

DESCRIPTION OF PREFERRED EMBODIMENTS

Figure 2:
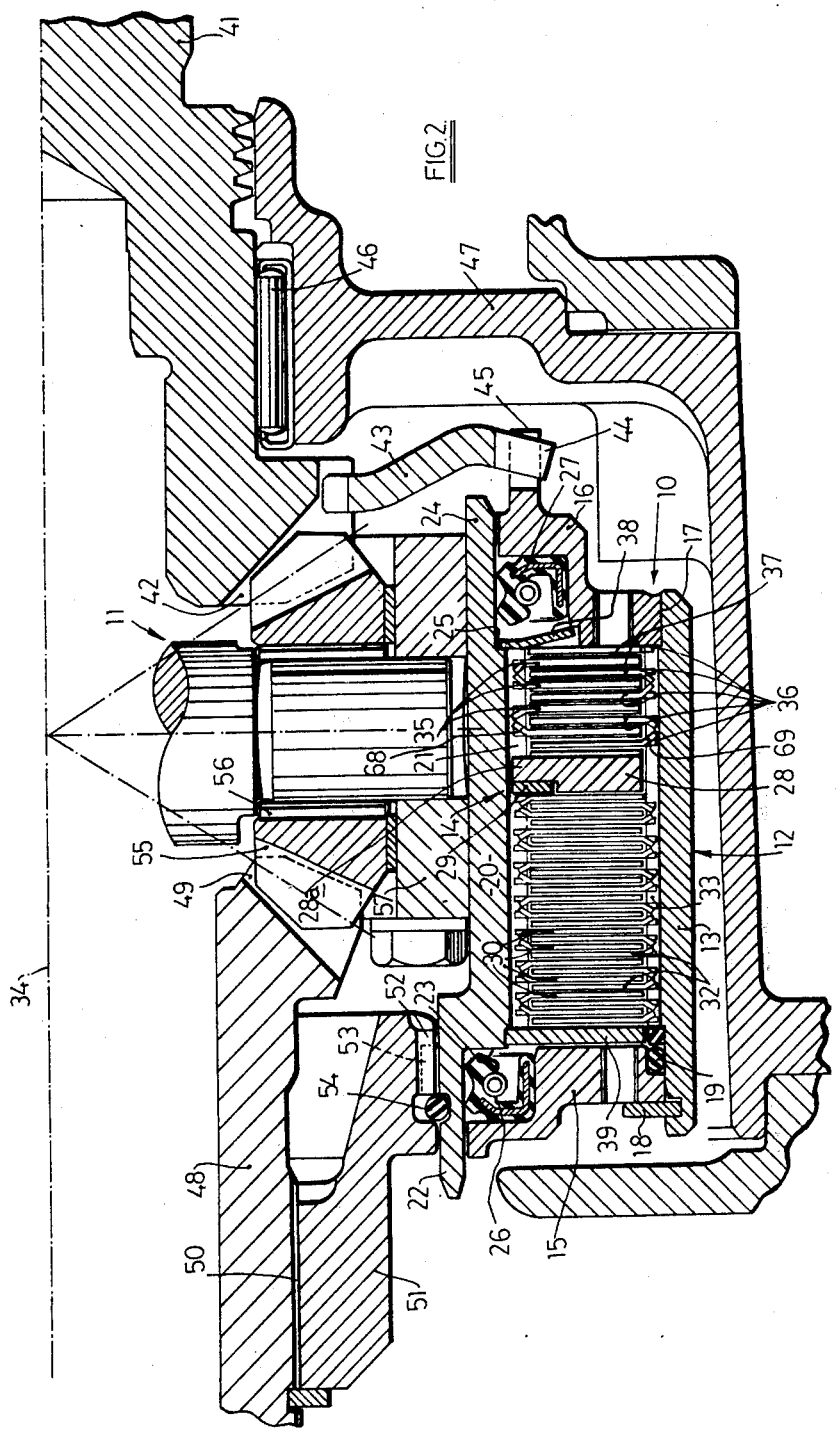
FIG. 2 is a half vertical section through a coupling embodying the invention with part of an associated differential gearing.

Referring to FIG. 1, this shows in diagrammatic form a four-wheel-drive vehicle in which a prime mover 1 drives a gearbox 3 via a clutch assembly 2. The gearbox 3 is connected with a rear wheel axle 5 via an interaxle differential and control coupling 11, 10, a rear wheel drive shaft 4 and an interwheel differential 5a. A front wheel shaft 8 is driven from the gearbox 3 via the differential and control coupling 11, 10, a transfer drive 6, a front wheel drive shaft 7 and an interwheel differential 8a.

The differential and control coupling combination of FIG. 1 is shown in detail in FIG. 2. The control coupling is indicated generally at 10 and part of the differential gearing is shown at 11.

The control coupling comprises an enclosure indicated generally at 12 which has an outer cylindrical wall 13 and an inner cylindrical wall 14, the latter being in the form of a differential piston, as will be described. End walls 15 and 16 extend between the inner and outer walls. The end wall 16 is welded at 17 to the outer wall 13 while the end wall 15 is held in position on the outer wall 13 by a circlip 18 and is sealed to the wall by a seal 19.

The inner cylindrical wall 14 comprises a central cylindrical portion 20 which is provided with grooves 21. At the left hand end of the central portion 20 is an end portion 22 of lesser diameter than the central portion 20 and a piston face 23 is formed between the portions 20 and 22. At the right hand end of the central portion 20 there is a further end portion 24 also of lesser diameter than the central portion 20 but of greater diameter than the end portion 22 and a piston face 25 is formed between the portions 20 and 24. It will be seen that the effective area of the piston face 23 is considerably greater than the effective area of the piston face 25. Seals 26 and 27 are interposed between the end wall 15 and the end portion 22 on the one hand and between the end wall 16 and the end portion 24 on the other.

The enclosure defined by the inner and outer cylindrical walls 14 and 13 and the end walls 15 and 16 contains a viscous liquid. A suitable liquid is a silicone fluid e.g. that marketed by the Dow Corning Inc. as X2-1073 having a nominal viscosity of between 30,000 centi-stokes and 60,000 centi-stokes i.e. a viscosity of this value at a temperature of 25° C. and at zero shear rate. The normal value of viscosity of the liquid used may be above or below these figures depending on the operating characteristics required i.e. between 5,000 and 100,000 centi-stokes at 25° C. and a zero shear rate. The liquid is preferably introduced by a vacuum filling process.

As mentioned above, the inner cylindrical wall 14 has grooves 21. These grooves are engaged by radially extending projections 28a provided on the inner periphery of an annular abutment 28 which divides the enclosure into two parts. The abutment 28 is prevented from moving to the left in the grooves 21 by the circlip 29.

To the left of the abutment 28 there are first and second sets of mutually interleaved, annular disc-like elements. Some of the elements of the first set are indicated at 30 in FIG. 2 and are also shown in more detail in FIGS. 3 and 4 while some of the elements of the second set are indicated at 32. The elements 30 have radially inwardly extending projections 60 at circumferentially-spaced positions on their inner peripheries which engage the grooves 21. Each projection 60 is in three portions, a central axially extending portion 61 and two outer purely radially extending portions 62 and 63. The central portions 61 of circumferentially adjacent projections on a given element 30 extend in opposite directions so that half the central portions 61 extend in each axial direction, and as can be seen from FIGS. 2 and 3 the axially extending portions 61 on adjacent elements 30 space the elements apart so that the distance $x$ between the facing surfaces of adjacent elements 30 is greater than the thickness $y$ of the interleaved element 32. The axially extending portions 61 may be resilient to a certain extent but this resilience will not allow the distance $x$ to become less than the thickness $y$ throughout the operation of the coupling.

The construction of the elements 32 is similar to that of the elements 30, the outer peripheries of the elements 32 being provided with projections 64 which engage the grooves 33. The projections 64 again include a central axially extending portion 67 and outer purely radially extending portions 65 and 66 which space the elements 32 so that the distance $u$ between the facing surfaces of adjacent elements 32 is greater than the thickness $v$ of the interleaved element 30. Again although the axially extending portions 67 may be resilient to a certain extent the distance $u$ is at all times maintained greater than the thickness $v$.

As shown, the elements 30 and 32 of both sets are free to move parallel to the rotary axis of the coupling which is indicated at 34. The elements 30 and 32 may have slots or openings therein, not shown, or they may be imperforate.

On the other side of the abutment 28 there are elements of third and fourth sets which are also mutually interleaved. The elements of the third set are indicated at 35 and the elements of the fourth set are indicated at 36. The elements 35 are provided on each surface with a facing of friction material, one pair of such facings being indicated at 37. If desired the third and fourth sets of elements could be constructed so that neither set of elements requires a facing of friction material.

The elements 35 and 36 are provided with radially extending projections 68 and 69 of similar form to the projections 60 and 64 on the elements 30 and 32 respectively the projections 68, 69 engage the grooves 21 and 33 respectively and have axially extending portions which space the elements 35 and 36 apart in the same manner as the elements 30 and 32. The axially extending portion of the projections 68 and 69 are again resilient as described above in relation to the elements 30 and 32. The spacing between the elements 35 and 36 may, with the coupling in a cold state, be greater than the spacing between the elements 30 and 32.

First spring means, in the form of a Belleville spring washer indicated at 38 acts between the end wall 16 and the right hand face 25 of the differential piston provided by the inner cylindrical wall 14 urges the abutment 28 to the left. This movement of the wall 14 to the left is limited by an annular abutment 39 secured to the left hand end of the central portion 20 of the wall 14 engaging the end wall 15.

As mentioned, the control coupling is associated with a differential gearing. This gearing is of the bevel type and comprises a first shaft 41 which is connected with the rear wheel drive shaft 4 and has a bevel gear 42 formed integrally therewith. Engaged with the gear 42 is a toothed member 43 whose teeth 44 engage with teeth 45 on the end wall 16. It will be seen, therefore, that the outer cylindrical wall 13 together with the elements 32 and 36 of the second and fourth sets of elements are drivingly connected for rotation with the shaft 41. The shaft 41 is supported for rotation in a bearing 46 and in a housing 47. There is a second shaft 48 which is connected with the front wheel drive shaft 7 via the transfer drive 6. The shaft 48 is formed at one end with a bevel gear 49. Surrounding the shaft 48, and splined thereto at 50 is a collar 51. The collar has external splines 52 which engage with internal splines 53 on the end portion 22 of the inner cylindrical wall 14. It will be seen therefore, that the inner cylindrical wall 14 together with the elements 30 and 35 of the first and third sets of elements are drivingly connected for rotation to the shaft 48. A seal 54 is received between the collar 51 and the end portion 22.

A series of planet gears, one of which is indicated at 55 mesh with the gears 42 and 49 and are supported on bearings 56 in a planet carrier 57 which is driven by means not shown which is connected with the gearbox 3 and provides the input to the differential gearing 11.

The operation of the coupling arrangement shown in FIGS. 2 to 4 is as follows. If it be assumed that there is rotation between the shafts 41 and 48, as a result a speed difference occurring between the front and rear axles 8 and 5, then there will be relative rotation between the outer and inner cylindrical wall 13 and 14 of the coupling. Assuming that this relative rotation starts the coupling at ambient temperature, the elements 30 and 32 of the first and second sets and also the elements 35 and 36 of the third and fourth sets will, via the viscous liquid, transmit torque between the shafts 41 and 48. Due to this viscous shear, there will be generation of heat within the enclosure. The liquid will expand relative to the enclosure and a pressure above ambient will be generated within the enclosure. This pressure will operate on the piston faces 23 and 25 of the inner cylindrical wall 14. Since the area of the piston face 23 is greater than the area of the piston face 25, the pressure will tend to force the inner cylindrical wall 14 to the right against the action of the spring 38 which is tending to hold it to the left as described above. Movement of the cylindrical wall 14 is accompanied by movement of the collar 51 on the splines 50. As the inner cylindrical wall 14 moves to the right with the increasing pressure in the enclosure the abutment 28 will move to the right and will compress the resilient axially extending portions of the projections 68 and 69 causing the elements 35 and 36 of the third and fourth sets to come closer together thus increasing the viscous shear capability of the third and fourth sets and, if the pressure in the enclosure rises to a sufficiently high level, eventually bringing the third and fourth sets into mutual clutching engagement so that they will act as a clutch and will thus tend to lock together the shafts 41 and 48. The interengagement of the third and fourth sets cuts down the rate of heat generation in the coupling. This will allow the temperature of the coupling to fall and thus the pressure to fall and in due course the spring 38 will overcome the force on the inner cylindrical wall 14 and will disengage the third and fourth sets of elements so that they again operate as a viscous shear coupling.

In the embodiment described above, since the elements 30 and 32 are free to move parallel to the axis 34, we find that as the pressure rises and the piston is moved there is a tendency for the elements 30 and 32 to be displaced axially. Since the spacing between the elements is controlled by the projections 60 and 64 it is ensured that none of the adjacent elements 30 and 32 can come into mutual clutching engagement and the elements 30 and 32 therefore at all times operate as a viscous shear coupling. Similarly the axially extending resilient positions on the projections 68 and 69 ensure that the elements 35 and 36 operate as a viscous shear coupling until displacement of the abutment 28 brings the elements 35 and 36 into engagement.

Experience has shown that if the spacing between the elements of neither the first and second sets is controlled, these elements tend to be axially displaced as movement of the piston 14 occurs, and adjacent groups of these elements come into mutual clutching engagement thus destroying to some extent the viscous shearing property of the elements and hence adversely affecting the torque transmitting characteristics of the coupling. We have found, however, that it is possible to arrange the first and second sets of elements to retain an appreciable viscous shearing capacity by only arranging either the projections 60 or 64 to include axially extending portions. It is thus within the invention to only control the spacing between the facing surfaces of one set of the first and second sets.

We have also similarly found that it is possible for the elements 35 and 36 to be arranged to retain sufficient viscous shearing capacity before the elements 35 and 36 come into frictional engagement by controlling the spacing between the facing surfaces of only one of the third and fourth sets of elements 35 and 36. Such a construction is also within the scope of the present invention.

All the free volume of the enclosure (i.e. that part of the total volume of the enclosure not occupied by parts of the coupling) may be arranged to be filled with viscous liquid when the coupling is not in operation and is at ambient temperature. However we have found that if the free volume of the enclosure is completely filled at ambient, the pressure in the enclosure is slow to decrease once the elements 35 and 36 have come into clutching engagement. This tends to lead to the elements 35 and 36 being in clutching engagement for longer periods than is necessary. We have found that the elements 35 and 36 can be arranged to disengage more quickly by arranging between 3 and 10 percent of the free volume of the enclosure to be occupied by air at ambient temperature. This inclusion of air results in a more rapid fall in the pressure in the enclosure once the elements 35 and 36 come into clutching engagement but at the same time will make the rise in pressure in the enclosure initially slower since the first expansion of the liquid is taken up in compressing the included air.

The viscous liquid used in the enclosure has a volumetric thermal expansion typically of 10% per 100° C. increase in temperature. When designing the coupling the designer will decide on the temperature at which he wishes the elements 35 and 36 to frictionally engage and this will tell him the increase in volume which will therefore occur in the viscous liquid during operation of the unit. From this the designer can then work out the differential area and stroke of the piston 14 which will give the desired clutch engaging pressure at the desired clutch engaging temperature, bearing in mind that, since the piston 14 is of differential form, as the piston is displaced to bring the elements 35 and 36 closer together the total volume of the enclosure will increase slightly.

The curve 6a in FIG. 6 shows the variation of torque (T) with time (t) in a — viscous shear coupling not provided with the clutch elements 35 and 36 of the present invention. It will be seen that the torque transmitted by the coupling decreases as the temperature of the coupling rises and the viscosity of the liquid decreases. Curve 6b shows the corresponding ideal torque-time characteristic for a coupling of the form shown in FIGS. 2 to 4.

The lines X and Y in FIG. 6 define a part of the operating range of the coupling during which the curve 6b is substantially horizontal as shown at 6c. This horizontal portion of the curve is when the piston 14 is being displaced against the spring 38 and the elements 35 and 36 have not actually come into frictional engagement. Typically the line Y denotes the time taken to reach a fluid temperature of 120° C and to cater for adverse climate conditions the line X denotes the time taken to reach a fluid temperature of −10° C. Thus during this wide temperature range the coupling has a substantially constant torque transmitting capability, the elements 35 and 36 being brought closer together and thus compensating for the decrease in the viscosity of the liquid which occurs as the temperature of the liquid rises.

The line Y also denotes the point on the curve 6b at which the elements 35 and 36 first make actual frictional contact. The curve 6b rises sharply after the line Y as the force of engagement of the elements 35 and 36 increases.

In practice the ideal curve 6b may not be obtained but it is possible to achieve curves which approximate to this ideal and lie in the range denoted by the dotted curves 6d and 6e.

FIG. 5 shows a further form of coupling 70 embodying the present invention used in combination with a differential gearing 71. This coupling and differential can be used in the four wheel drive vehicle of FIG. 1 in place of the coupling and differential 10, 11 of FIGS. 2 to 4.

The coupling 70 comprises an enclosure formed by end plates 72 and 73 and inner and outer cylindrical members 74 and 75 respectively. The enclosure is filled with a viscous liquid as described above in relation to FIGS. 2 to 4. The inner cylindrical member 74 again acts as a differential piston since its lefthand end 76 exposed to the liquid in the enclosure has a larger area than the exposed righthand end 77. First and second sets of elements 78 and 79 respectively are of identical construction to the sets of elements 30 and 32 described above and are again splined onto the inner cylindrical member 74 and the outer cylindrical member 75 respectively. An abutment 80 similar to the abutment 28 is again splined onto the inner cylindrical member 74 and contacts a circlip 81 similar to the circlip 29.

Third and fourth sets of elements 82 and 83 are provided on the righthand side of the abutment 80. The elements 82 and 83 are identical in construction to the elements 35 and 36 described above and are again splined onto the inner and outer cylindrical members 74 and 75 respectively.

The inner cylindrical member 74 includes an additional annular piston 84 which is arranged to be acted upon by a second spring means in the form of a longer spring 85 and a shorter spring 86. Movement of the piston to the left is limited by a circlip 87a. The lefthand end of the piston 84 is exposed to the pressure in the enclosure and the piston 84 will thus be deflected against the springs 85 and 86 when the enclosure pressure rises to a sufficiently high level as described below.

The differential piston 74 is biased to the left by a first spring means in the form of a coil spring 87.

The differential 71 comprises planet wheels 88 carried on a carrier 89 which is splined at 90 to an input shaft 91 which is connected with the gear box 3 of FIG. 1. An output shaft 92 which provides a shoulder 93 against which the spring 87 abuts is thus splined at 94 to a bevel wheel 95 of the differential. The output shaft 92 is connected with the rear wheel drive shaft 4 of FIG. 1.

The other bevel 96 of the differential is welded to the end plate 73 which is non-rotatably secured to the outer cylindrical member 75 and hence via the other end plate 72 with an output shaft 97 which is arranged to be connected with the front wheel drive shaft 7 via the transfer drive 6.

FIG. 7 shows the torque transmitting characteristic of coupling shown in FIG. 5 which is basically similar to the characteristic of FIG. 6. The coupling operates as follows: Relative rotation of the shafts 92 and 97 resulting from a speed differential between the front and rear wheel shafts 7 and 4 of FIG. 1 causes the plates 78, 79 and 82, 83 to rotate relative to each other and generate heat within the enclosure due to the viscous shearing of the liquid contained therein. This heat generation again causes a rise in the pressure in the enclosure.

As the pressure in the enclosure increases the piston 74 is moved against the spring 87 and the abutment 80 brings the plates 82 and 83 towards each other in the same manner as the piston 14 of FIGS. 2 to 4. This is shown by the portion 7c of FIG. 7 which corresponds to the portion 6c of FIG. 6. The lines X and Y in FIG. 7 correspond to the lines X and Y in FIG. 6 and at the line Y the plates 82 and 83 again come into clutching engagement.

The rate of the second spring means 85, 86 is chosen so that after the plates 82 and 83 come into engagement any increase in pressure in the enclosure displaces the piston 84 against the second spring means so that the increase in the torque transmitting capability of the coupling is less steep than in the arrangement of FIGS. 2 to 4. Initially, after engagement of the plates 82 and 83, the piston 84 is displaced solely against the spring 85 and the torque characteristic rises as shown at 7e. If the pressure continues to rise the piston 84 eventually also acts against the spring 86 and the curve of FIG. 7 then rises more steeply as shown at 7f. The dotted portion 7g of the curve shows the comparable rise in torque characteristic which would be obtained using the arrangement of FIGS. 2 to 4 in which no additional piston 84 is employed.

It will therefore be seen that by providing the additional piston 84 it is possible to make the rise in the torque characteristic less steep than it would otherwise be.

I claim:

1. A control coupling comprising an enclosure containing a viscous liquid; first and second sets of mutually interleaved elements and third and fourth sets of mutually interleaved elements arranged for rotation about a common axis within the enclosure with the viscous liquid in contact with facing working surfaces of said interleaved elements, said first and third sets of elements having driving connections with a first rotatable member and said second and fourth sets of elements having driving connections with a second rotatable member; spacing means to space apart adjacent elements of at least one of said first and second sets and resilient spacing means to space apart adjacent elements of at least one of said third and fourth sets so that the facing surfaces of adjacent elements of each spaced set are spaced apart by distances greater than the thicknesses of the portions of the elements of the other set interleaved between said facing surfaces; a differential piston subject to the pressure in the enclosure; an abutment carried by the piston; and first spring means urging the piston to a first position in which the facing surfaces of adjacent elements of the or each spaced set of said third and fourth sets are spaced apart by distances greater than the thicknesses of the portions of the elements of the other set interleaved between said facing surfaces, the arrangement being such that as the pressure of the liquid in the enclosure increases the piston moves against the first spring means to cause the abutment to compress said resilient spacing means and bring the elements of the third and fourth sets into mutually clutching engagement.

2. A coupling according to claim 1 in which the third and fourth sets of elements operate as a viscous shear coupling whenever the elements thereof are not in mutual clutching engagement.

3. A coupling according to claim 1 in which spacing means are provided to space apart the facing surfaces of adjacent elements of both said first and second sets by distances greater than the thicknesses of the portions of the elements of the other set interleaved between said facing surfaces.

4. A coupling according to claim 1 in which resilient spacing means are provided to space apart the facing surfaces of adjacent elements of both said third and fourth sets by distances greater than the thicknesses of the portions of the elements of the other set interleaved between said facing surfaces.

5. A coupling according to claim 1 in which the spacing means for each spaced set comprises axially extending projections on a peripheral portion of each element of each spaced set, the projections on each element extending towards and co-operating with the projections on each adjacent element to give said spacing.

6. A coupling according to claim 1 in which the enclosure has inner and outer cylindrical walls coaxial with said axis which form said first and second rotatable members and the inner wall is provided by the differential piston.

7. A coupling according to claim 6 in which the abutment is annular and extends from the inner cylindrical wall towards the outer cylindrical wall thus dividing the enclosure into two parts with the elements of the first and second sets on one side of the abutment in one part of the enclosure and the elements of the third and fourth sets on the other side of the abutment in the other part of the enclosure.

8. A coupling according to claim 1 in which an additional piston is in communication with the enclosure so that increase in the liquid pressure in the enclosure upon or after the clutching engagement of the third and fourth sets moves the piston against a second spring means thereby increasing the volume of the enclosure and hence enabling the torque transmitting characteristic of the coupling after the engagement of the elements of the third and fourth sets to be controlled in dependence on the second spring means.

9. The combination of a control coupling according to claim 1 and a differential gearing in which the elements of the first and third sets on the one hand and the elements of the second and fourth sets on the other hand are drivingly connected to two relatively rotatable elements of the gearing.

10. A four wheel drive vehicle having front and rear driven axles and including a combination according to claim 9, the differential gearing having two outputs which are connected to the front and rear driven axles respectively.

* * * * *